US009596800B2

(12) United States Patent  
Sudbrink et al.

(10) Patent No.: US 9,596,800 B2  
(45) Date of Patent: *Mar. 21, 2017

(54) TRIPLE-FOLD AGRICULTURAL IMPLEMENT WITH NARROW AND LOW TRANSPORT PROFILE

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 218 days.

This patent is subject to a terminal disclaimer.

(21) Appl. No.: 14/523,272

(22) Filed: Oct. 24, 2014

(65) Prior Publication Data

US 2015/0129250 A1 May 14, 2015

Related U.S. Application Data

(60) Provisional application No. 61/903,464, filed on Nov. 13, 2013.

(51) Int. Cl.  
*A01B 73/04* (2006.01)

(52) U.S. Cl.  
CPC .......... *A01B 73/044* (2013.01); *A01B 73/046* (2013.01)

(58) Field of Classification Search  
CPC ......... A01B 73/00; A01B 73/02; A01B 73/04; A01B 73/044; A01B 73/046  
See application file for complete search history.

(56) References Cited

U.S. PATENT DOCUMENTS

| | | | | |
|---|---|---|---|---|
| 4,133,391 A | * | 1/1979 | Richardson | A01B 73/046 172/1 |
| 4,191,260 A | * | 3/1980 | Klindworth | A01B 73/046 16/370 |
| 4,249,616 A | * | 2/1981 | Moe | A01B 73/044 172/311 |
| 4,355,689 A | * | 10/1982 | Friggstad | A01B 73/046 172/311 |
| 6,089,329 A | * | 7/2000 | Smith | A01B 73/046 172/452 |
| 7,497,269 B2 | * | 3/2009 | Jagow | A01B 73/046 172/311 |
| 8,122,970 B2 | * | 2/2012 | Palen | A01B 73/046 172/311 |

(Continued)

*Primary Examiner* — Matthew D Troutman  
(74) *Attorney, Agent, or Firm* — Rebecca L. Henkel; Rickard K. DeMille (57) ABSTRACT

A triple-fold agricultural implement includes a center frame section, and a plurality of wing sections positioned on opposite lateral sides of the center frame section. The plurality of wing sections include an inner wing section, a middle wing section and an outer wing section. Each outer wing section may be folded approximately 180° laterally inward and over a respective middle wing section. Each middle wing section may be folded approximately 180° laterally inward and over a respective inner wing section. Each inner wing section may be folded approximately 90° laterally inward and over the center frame section, whereby each of the plurality of wing sections when in a folded state are in a transport position lying above the center frame section.

15 Claims, 8 Drawing Sheets

(56) References Cited

U.S. PATENT DOCUMENTS

| | | | | |
|---|---|---|---|---|
| 8,505,645 | B1* | 8/2013 | Kelly | A01B 73/046 |
| | | | | 172/311 |
| 8,776,908 | B2* | 7/2014 | Maro | A01B 73/046 |
| | | | | 172/311 |
| 8,893,816 | B2* | 11/2014 | Maro | A01B 73/046 |
| | | | | 172/311 |
| 2002/0043378 | A1* | 4/2002 | Hundeby | A01B 27/00 |
| | | | | 172/239 |
| 2007/0079976 | A1* | 4/2007 | Jagow | A01B 73/046 |
| | | | | 172/311 |
| 2012/0247378 | A1* | 10/2012 | Knobloch | A01C 23/023 |
| | | | | 111/120 |
| 2014/0060035 | A1* | 3/2014 | Barfels | F15B 1/024 |
| | | | | 60/484 |
| 2014/0060860 | A1* | 3/2014 | Maro | A01B 73/046 |
| | | | | 172/1 |
| 2014/0060865 | A1* | 3/2014 | Maro | A01B 73/046 |
| | | | | 172/311 |

* cited by examiner

TRIPLE-FOLD AGRICULTURAL IMPLEMENT WITH NARROW AND LOW TRANSPORT PROFILE

CROSS REFERENCE TO RELATED APPLICATIONS

This is a non-provisional application based upon U.S. provisional patent application Ser. No. 61/903,464, entitled "TRIPLE-FOLD TILLAGE IMPLEMENT WITH NARROW AND LOW PROFILE", filed Nov. 13, 2013, which is incorporated herein by reference.

BACKGROUND OF THE INVENTION

1. Field of the Invention

The present invention relates to agricultural implements, and, more particularly, to agricultural tillage implements.

2. Description of the Related Art

Farmers utilize a wide variety of tillage implements to prepare soil for planting. Some such implements may include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof.

As tillage implements become wider and wider over time, it becomes more difficult to convert the tillage implement from an operating mode to a transport mode, or vice versa, without requiring too much time and difficulty on the part of the operator. It is desirable for the tillage implement to be converted from one mode to the other while the operator remains within the operator cab, through the use of hydraulics or other actuators. It is also desirable for the tillage implement to remain within certain geometric constraints so that it is not necessary to use a separate "escort vehicle" or the like when traveling on public roads.

What is needed in the art is an agricultural implement which can have a triple-fold configuration with a wide operating width, e.g., greater than 50 feet, while still being folded remotely to a compact transport position.

SUMMARY OF THE INVENTION

The present invention provides a triple-fold field cultivator which is capable of being folded into a compact transport position.

The invention in one form is directed to a triple-fold agricultural implement including a center frame section, and a plurality of wing sections positioned on opposite lateral sides of the center frame section. The plurality of wing sections include an inner wing section, a middle wing section and an outer wing section. Each outer wing section may be folded approximately 180° laterally inward and over a respective middle wing section. Each middle wing section may be folded approximately 180° laterally inward and over a respective inner wing section. Each inner wing section may be folded approximately 90° laterally inward and over the center frame section, whereby each of the plurality of wing sections when in a folded state are in a transport position lying above the center frame section.

The invention in another form is directed to a method of folding a triple-fold agricultural implement from an operating position to a transport position. The implement includes a center frame section and a plurality of wing sections, with a pair of inner wing sections, a pair of middle wing sections and a pair of outer wing sections. The method includes the steps of: folding each outer wing section approximately 180° laterally inward and over a respective middle wing section; folding each middle wing section approximately 180° laterally inward and over a respective inner wing section, and folding each inner wing section approximately 90° laterally inward and over the center frame section, whereby each of the plurality of wing sections when in a folded state are in a transport position lying above the center frame section.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
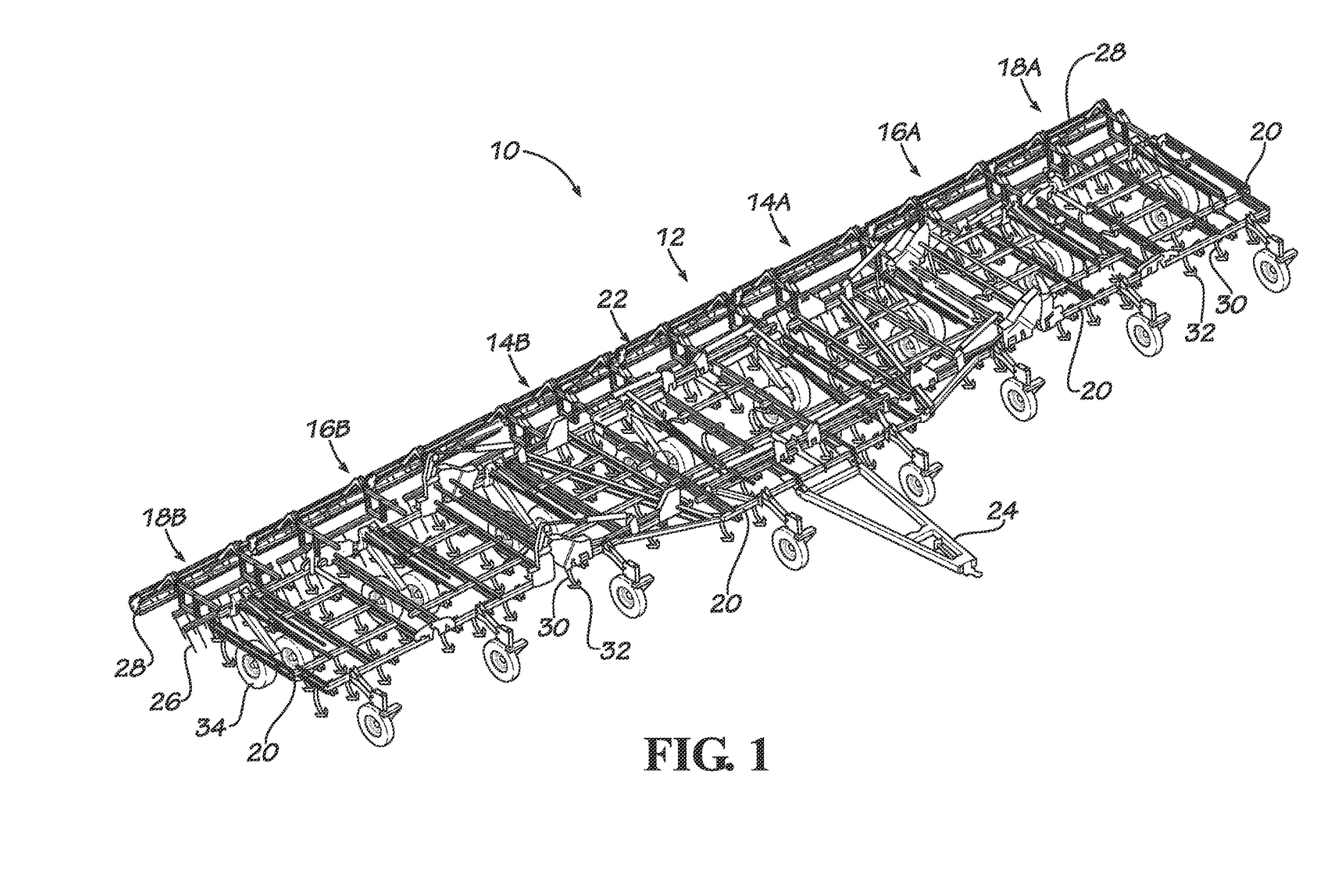
FIG. 1 is a top perspective view of an embodiment of an agricultural tillage implement of the present invention, in the form of a field cultivator, in an unfolded position.

Referring now to the drawings, and more particularly to FIG. 1, there is shown an embodiment of an agricultural implement of the present invention. In the illustrated embodiment, the agricultural implement is in the form of a field cultivator 10 for tilling and finishing soil prior to seeding. However, the present invention may be used with other types of agricultural implements such as air seeders, planters, etc.

Field cultivator 10 is configured as a multi-section field cultivator, and includes a center frame section 12 and a plurality of wing sections 14, 16 and 18. In the illustrated embodiment, field cultivator 10 has a triple-fold configuration with three left wings sections designated 14A, 16A and 18A, and three right wing sections designated 14B, 16B and 18B. Wing sections 14A and 14B are each inner wing sections, wing sections 16A and 16B are each middle wing sections, and wing sections 18A and 18B are each outer wing sections.

Center frame section 12 is the center section that is directly towed by a traction unit, such as an agricultural tractor (not shown). Center frame section 12 generally functions to carry a shank frame 20 for tilling the soil, and a rear auxiliary implement 22 for finishing the soil. A pull hitch 24 extends forward from shank frame 20 of center frame section 12, and is coupled with the traction unit in known manner.

Rear auxiliary implement 22 includes a spring tooth drag 26 and a rolling (aka, crumbler) basket 28 which coact with each other to finish the soil. However, rear auxiliary implement 22 can be differently configured, such as a spike tooth drag, cultivator shanks, etc.

Figure 2:
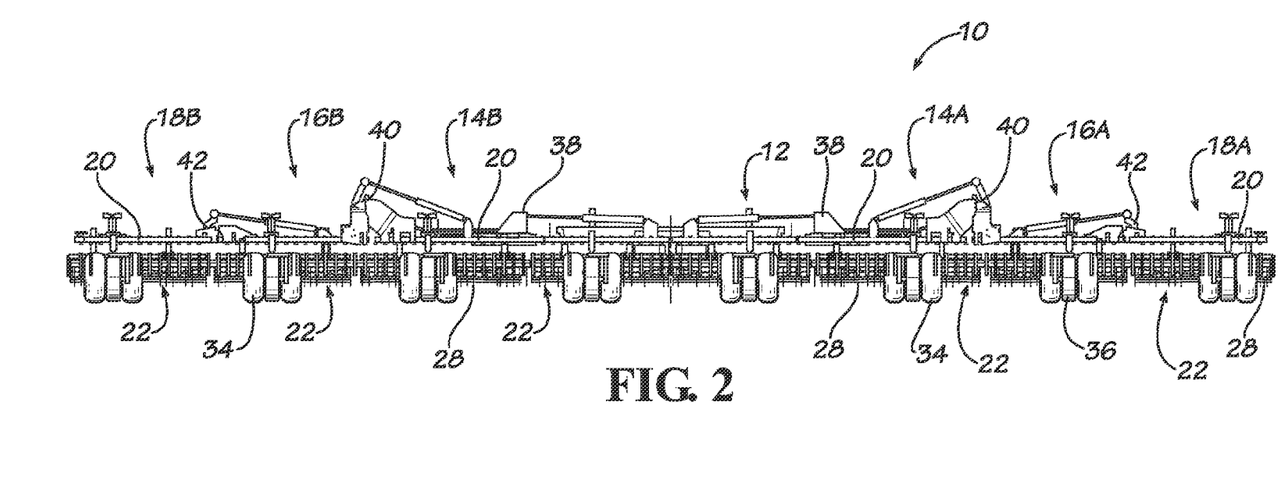
FIG. 2 is a front view of the field cultivator shown in FIG. 1.

Shank frame 20 generally functions to carry cultivator shanks 30 with shovels 32 at their lower ends for tilling the soil. Rear lift wheels 34 are used for raising and lowering the shank frame 20 with a hydraulic lift cylinder (not specifically visible in FIGS. 1 and 2), and a pair of front gauge wheels 36 are used to level the shank frame 20 during a field operation.

Similarly, each inner wing section 14A and 14B, middle wing section 16A and 16B, and outer wing section 18A and 18B includes a shank frame 20 for tilling the soil, a rear auxiliary implement 22 for finishing the soil, rear lift wheels 34 and front gauge wheels 36. These components are slightly different from but still similar to the like-named components described above with regard to center frame section 12, and are not described in further detail herein.

Figure 3:
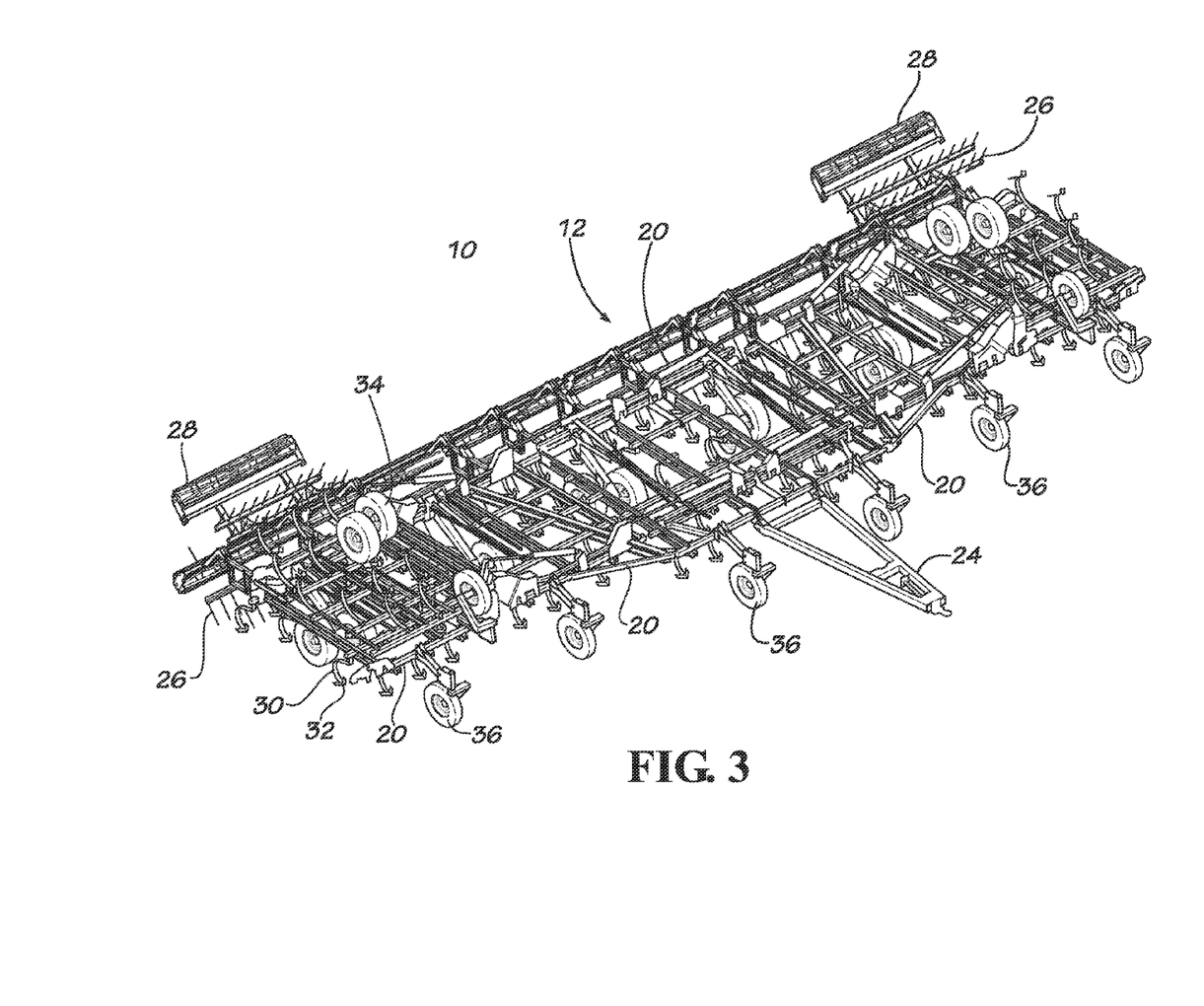
FIG. 3 is a top perspective view of the field cultivator shown in FIGS. 1-2, with the outer wing sections folded to a transport position.
Figure 4:
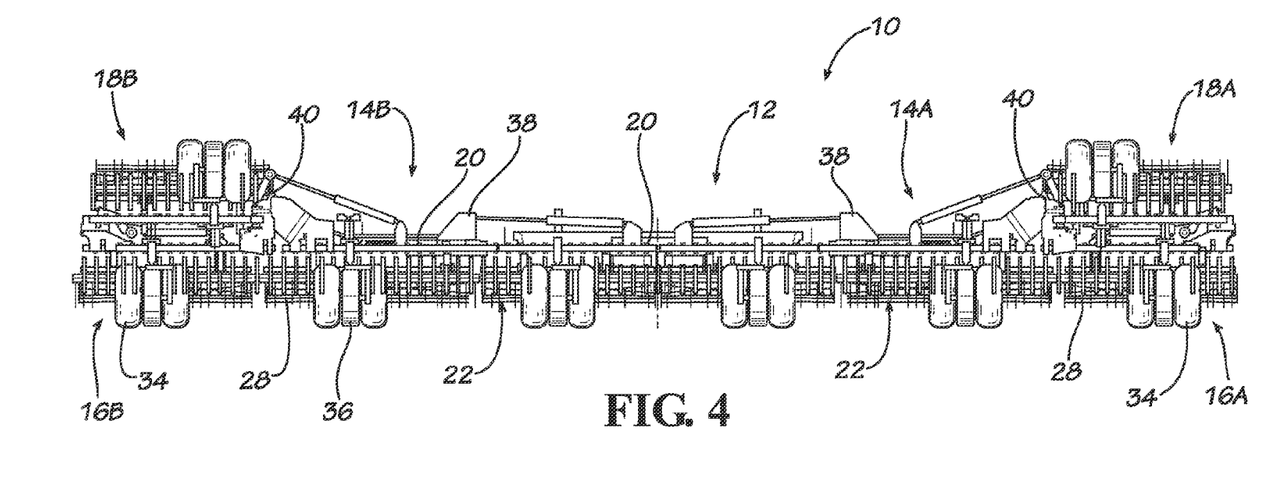
FIG. 4 is a front view of the field cultivator shown in FIG. 3, with the outer wing sections folded to the transport position.
Figure 5:
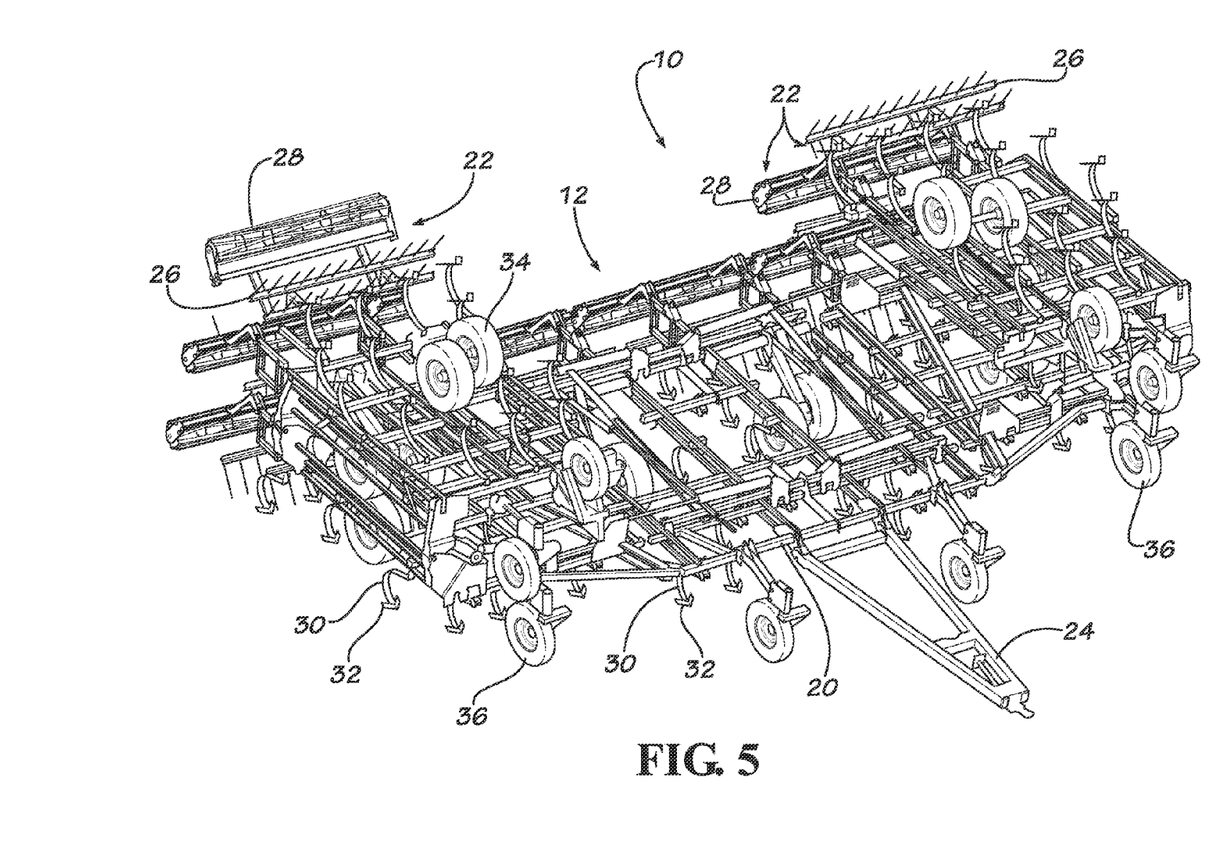
FIG. 5 is a top perspective view of the field cultivator shown in FIGS. 1-4, with the middle wing sections folded to a transport position.
Figure 6:
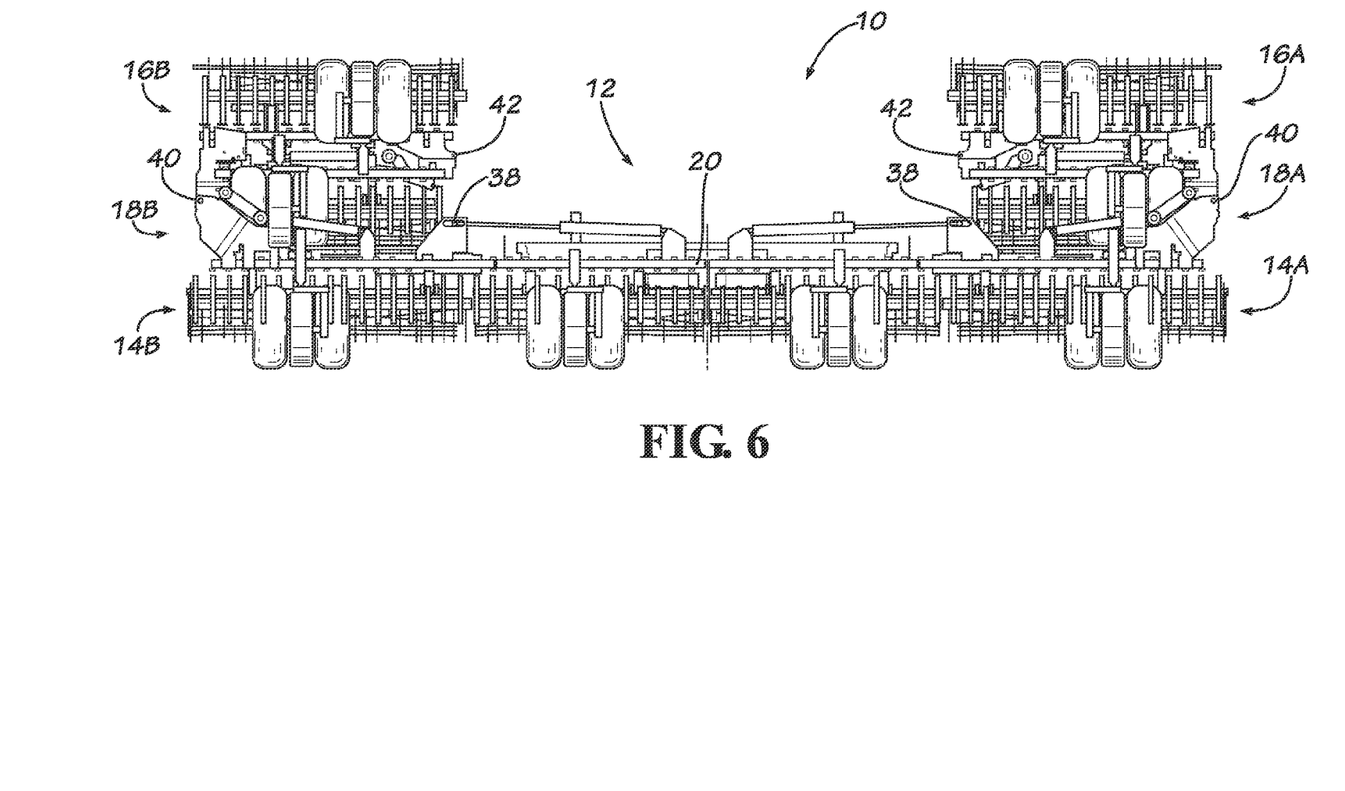
FIG. 6 is a front view of the field cultivator shown in FIG. 5, with the middle wing sections folded to the transport position.
Figure 7:
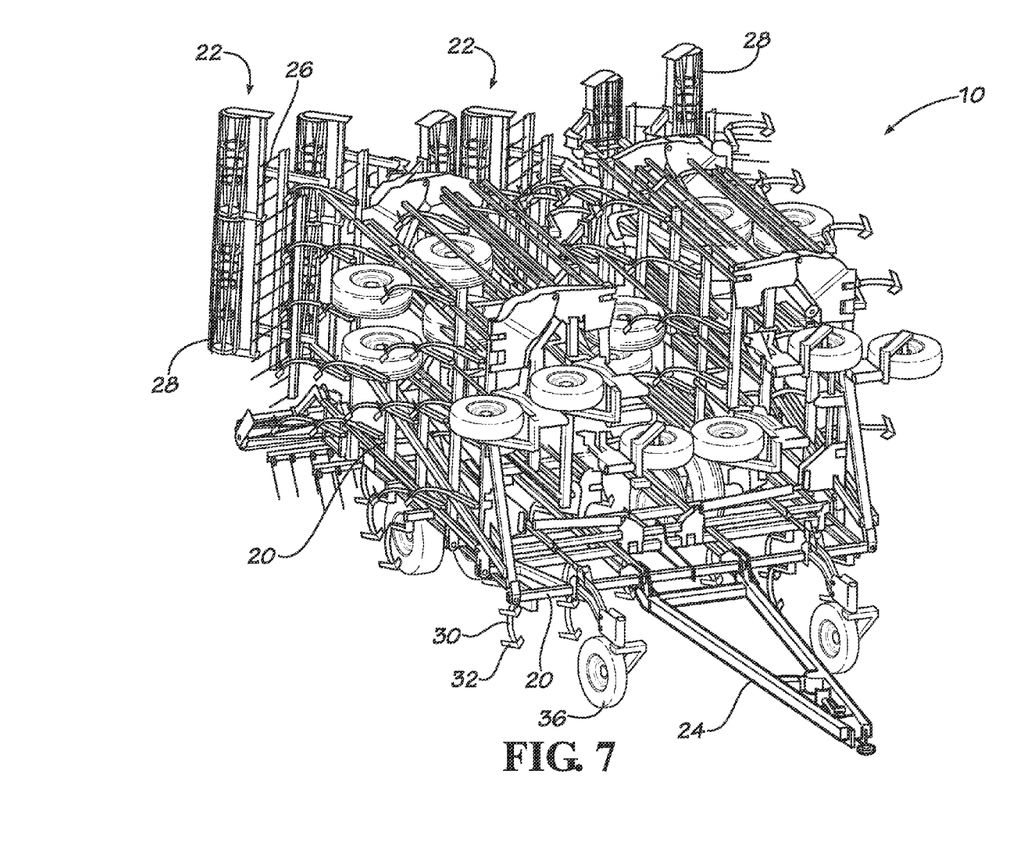
FIG. 7 is a top perspective view of the field cultivator shown in FIGS. 1-6, with the inner wing sections folded to a transport position.
Figure 8:
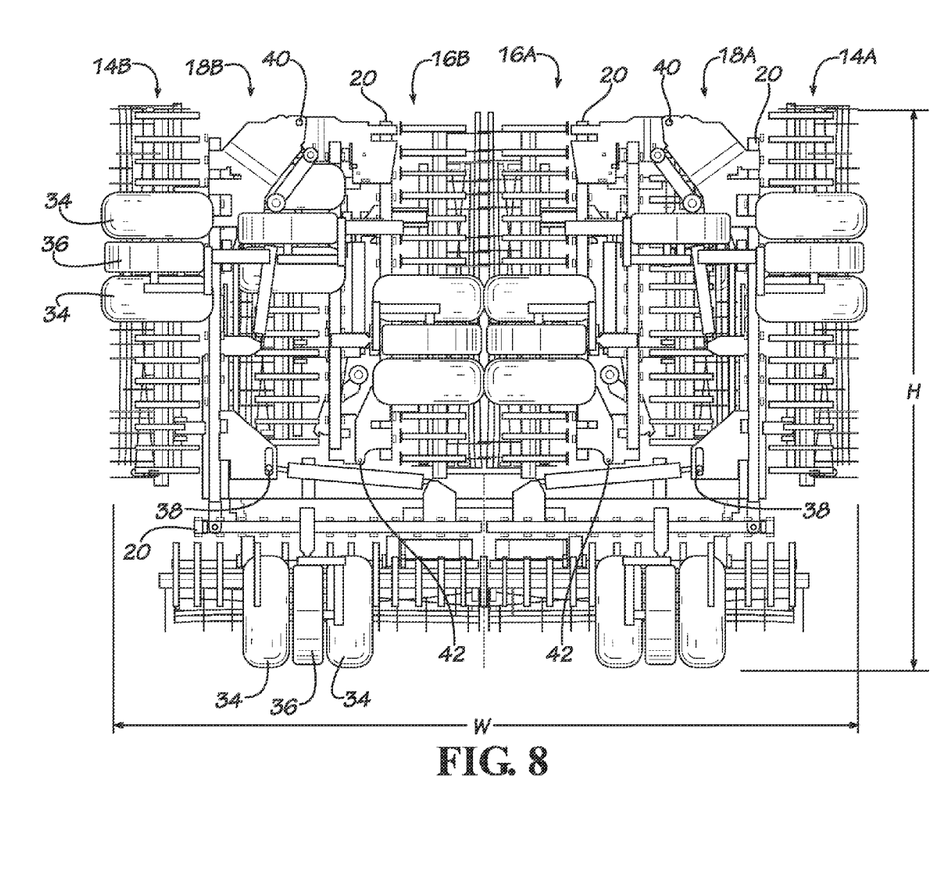
FIG. 8 is a front view of the field cultivator shown in FIG. 7, with the inner wing sections folded to the transport position.

During use, it is periodically necessary to move the field cultivator 10 from an unfolded (operating) position to a folded (transport) position. First, each outer wing section 18A and 18B is folded approximately 180° laterally inward and over a respective middle wing section 16A and 16B (FIGS. 3 and 4). With the outer wing sections 18A and 18B in the folded state, each middle wing section 16A and 16B is then folded approximately 180° laterally inward and over a respective inner wing section 14A and 14B (FIGS. 5 and 6). With the middle wing sections 16A and 16B in the folded state, each inner wing section 14A and 14B is then folded approximately 90° laterally inward and over the center frame section 12 (FIGS. 7 and 8). The outer wing sections 18, middle wing sections 16 and inner wing sections 14 thus stack together in a horizontally arranged stack over the center frame section 12 when in the folded state. That is, as best seen in FIG. 8, each of the wing sections 16, 18 and 20 are individually positioned in a generally vertical orientation, while the wings sections together are arranged in a side-by-side arrangement and define a generally horizontal stack of the wing sections. When in the folded state, the outer wing sections 18 are sandwiched between a respective middle wing section 16 and inner wing section 14. To unfold the field cultivator 10 and transform back to the field or operating position shown in FIGS. 1 and 2, the folding sequence described above is simply reversed.

The outer wing sections 18, middle wing sections 16 and inner wing sections 14 are stacked together in a horizontally arranged stack over the center frame section 12 when in the folded state (FIG. 8). To allow this type of nested stacking configuration, each of the wing sections 14, 16 and 18 have a pivot axis 38, 40 and 42 (FIG. 2), respectively, which is vertically offset to allow the wing sections to lie flat against the laterally inward shank frame 20/frame section 12 when in the folded state. The middle wing sections 16 have a pivot axis 40 that is vertically higher than pivot axes 38 and 42 of adjacent wing sections 14 and 18, when in the unfolded state.

Different countries and states have different regulatory highway requirements concerning oversized vehicles on the road. In the US, some states exempt agricultural equipment from such regulations, while others require that any type of vehicle on a road must comply with the oversized vehicle regulations. In Europe, the regulations may be more strict concerning the height and width of vehicles which may travel on a road without being accompanied by an escort vehicle. With the triple-fold field cultivator 10 of the present invention, the overall frontal profile dimensions when in the folded state fit within regulatory requirements for both the US and Europe. More particularly, with all of the wing sections 14, 16 and 18 in the folded state, the field cultivator 10 is then in a transport position with an overall frontal profile having dimensions with a maximum width "W" of no greater than approximately 20 feet, preferably 18 feet wide, and a height "H" of no greater than approximately 14 feet, preferably 13 feet, 6 inches high (FIG. 8).

These maximum frontal profile dimensions include all of the shank frames 20, shanks 30, rear lift wheels 34 and front gauge wheels 36, when in the folded state. The shank frames 20 and plurality of shanks 30 extending downwardly therefrom define a height "H" of the shank frames 20 when in the unfolded state. When the plurality of wing sections 14, 16 and 18 lie laterally adjacent to each other in the folded state, these same heights H of the shank frames 20 define a width W of the implement 10.

The rear auxiliary implements 22 are considered to be add-ons to the main field cultivator 10, and may be outside these overall frontal profile dimensions, at least if not folded upwardly for the transport position. However, it is the intention that all of field cultivator 10, including the rear auxiliary implements 22, be within these maximum frontal profile dimensions when in the transport position. In the illustrated embodiment, either prior to or during the folding sequence, each rear auxiliary implement 22 is preferably positioned at a predetermined location (e.g., fully or partially folded) so as not to interfere with folding of the respective wing section 14, 16 or 18. Similarly, either prior to or during the folding sequence, rear lift wheels 34 (and optionally front gauge wheels 36) are preferably positioned at a predetermined location (e.g., fully or partially folded) so as not to interfere with folding of the respective wing section 14, 16 or 18.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A triple-fold agricultural implement, comprising:
a center frame section; and
a plurality of wing sections positioned on opposite lateral sides of the center frame section, said plurality of wing sections including an inner wing section, a middle wing section and an outer wing section, each said outer wing section being configured to fold approximately 180° laterally inward and over a respective said middle wing section, each said middle wing section being configured to fold approximately 180° laterally inward and over a respective said inner wing section, and each said inner wing section being configured to fold approximately 90° laterally inward and over said center frame section, whereby each of said plurality of wing sections when in a folded state are in a transport position lying above said center frame section,
wherein each of said plurality of wing sections has a vertically offset pivot axis allowing said outer wing sections, said middle wing sections and an inner wing sections to stack together in a horizontally arranged stack over the center frame section when in the folded state,
wherein each said middle wing section has a pivot axis that is vertically higher than a pivot axis of an adjacent said outer wing section or inner wing section, when in a unfolded state.

2. The agricultural implement of claim 1, wherein each of the plurality of wing sections includes a shank frame, a plurality of shanks extending downwardly from a respective said shank frame, and a height corresponding to said shank frame and said plurality of shanks when in an unfolded state, and wherein each of the plurality of wing sections lie laterally adjacent to each other to define a width of the implement when in the folded state.

3. The agricultural implement of claim 1, wherein each said outer wing section is sandwiched between a respective said middle wing section and said inner wing section, when in the folded state.

4. The agricultural implement of claim 1, wherein each of said plurality of wing sections includes a rear auxiliary tillage implement, each said rear auxiliary tillage implement being positioned at a predetermined location so as not to interfere with folding of the respective said wing section.

5. The agricultural implement of claim 4, wherein each said rear auxiliary tillage implement includes a rolling basket.

6. The agricultural implement of claim 1, wherein each of said plurality of wing sections includes at least one lift wheel, each said lift wheel being positioned at a predetermined location so as not to interfere with folding of the respective said wing section.

7. The agricultural implement of claim 1, wherein the agricultural implement when in a folded state is in a transport position with an overall frontal profile having dimensions of no greater than approximately 20 feet wide by 14 feet high.

8. The agricultural implement of claim 1, wherein said agricultural implement is a field cultivator.

9. A method of folding a triple-fold agricultural implement from an operating position to a transport position, the implement including a center frame section and a plurality of wings sections, with a pair of inner wing sections, a pair of middle wing sections and a pair of outer wing sections, said method comprising the steps of:
folding each said outer wing section approximately 180° laterally inward and over a respective said middle wing section;
folding each said middle wing section approximately 180° laterally inward and over a respective said inner wing section, and
folding each said inner wing section approximately 90° laterally inward and over said center frame section, whereby each of said plurality of wing sections when in a folded state are in a transport position lying above said center frame section,
wherein each of said plurality of wing sections has a vertically offset pivot axis allowing said outer wing sections, said middle wing sections and an inner wing sections to stack together in a horizontally arranged stack over the center frame section when in the folded state, and
wherein each said middle wing section has a pivot axis that is vertically higher than a pivot axis of an adjacent said outer wing section or inner wing section, when in a unfolded state.

10. The method of folding a triple-fold agricultural implement of claim 9, wherein each of the plurality of wing sections includes a shank frame, a plurality of shanks extending downwardly from a respective said shank frame, and a height corresponding to said shank frame and said plurality of shanks when in an unfolded state, and wherein each of the plurality of wing sections lie laterally adjacent to each other to define a width of the implement when in the folded state.

11. The method of folding a triple-fold agricultural implement of claim 9, wherein each said outer wing section is sandwiched between a respective said middle wing section and said inner wing section, when in the folded state.

12. The method of folding a triple-fold agricultural implement of claim 9, wherein each of said plurality of wing sections includes a rear auxiliary tillage implement, each said rear auxiliary tillage implement being positioned at a predetermined location so as not to interfere with folding of the respective said wing section.

13. The method of folding a triple-fold agricultural implement of claim 9, wherein each of said plurality of wing sections includes at least one lift wheel, each said lift wheel being positioned at a predetermined location so as not to interfere with folding of the respective said wing section.

14. The method of folding a triple-fold agricultural implement of claim 9, wherein the agricultural implement when in a folded state is in a transport position with an overall frontal profile having dimensions of no greater than approximately 20 feet wide by 14 feet high.

15. The method of folding a triple-fold agricultural implement of claim 9, wherein said agricultural implement is a field cultivator.

* * * * *